No. 768,578.

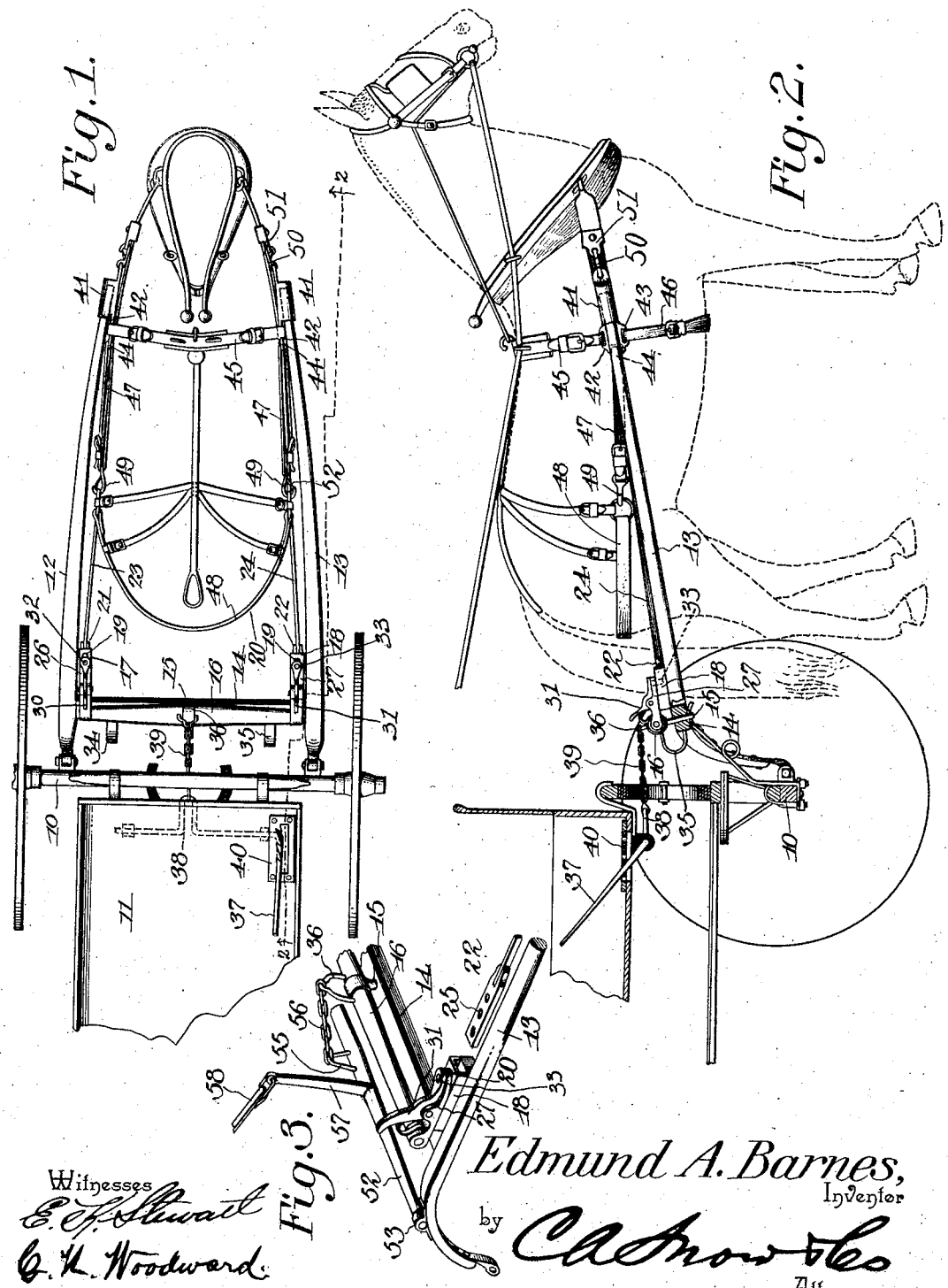

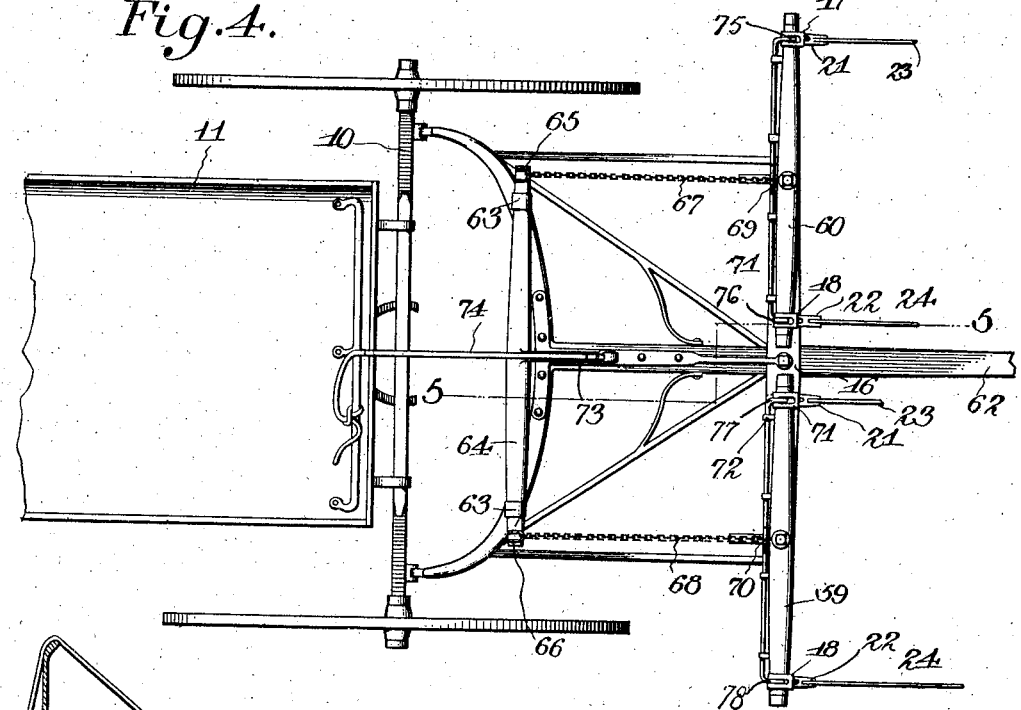
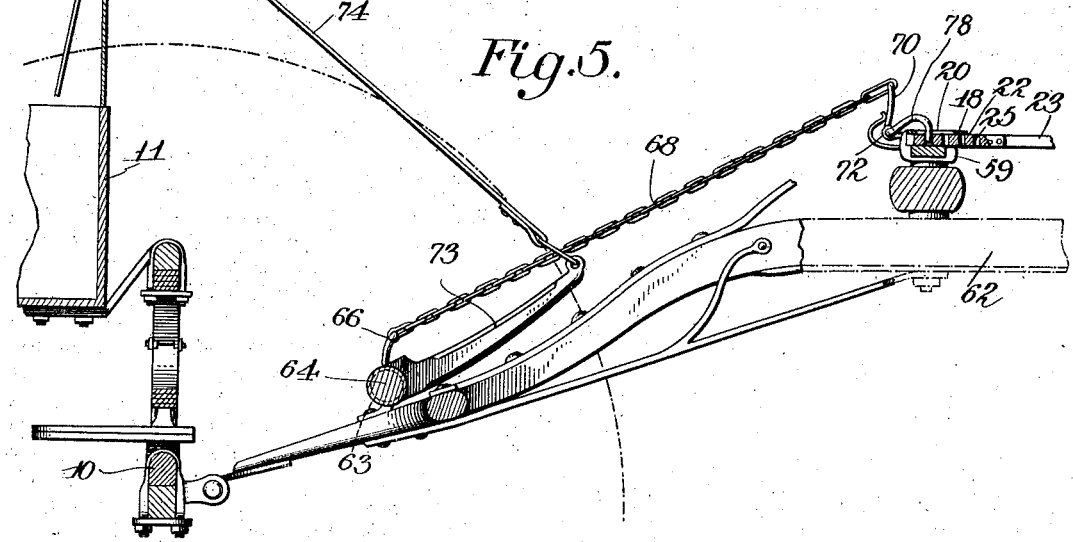

Patented August 30, 1904.

UNITED STATES PATENT OFFICE.

EDMUND A. BARNES, OF BRYAN, IDAHO.

HORSE-RELEASING DEVICE.

SPECIFICATION forming part of Letters Patent No. 768,578, dated August 30, 1904.

Application filed February 15, 1904. Serial No. 193,717. (No model.)

*To all whom it may concern:*

Be it known that I, EDMUND A. BARNES, a citizen of the United States, residing at Bryan, in the county of Bingham and State of Idaho, have invented a new and useful Horse-Releasing Device, of which the following is a specification.

This invention has reference to devices for attachment to vehicles whereby the horse or horses may be instantly released in event of their becoming fractious or running away or otherwise endangering the safety of the occupants of the vehicle, and has for its object to improve the construction and provide a device which may be applied to either a single or double vehicle and without material change in the structure of the same.

With these and other objects in view, which will appear as the nature of the invention is better understood, the same consists in certain novel features of construction, as hereinafter described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

In the drawings thus employed, Figure 1 is a plan view, partially in section, and Fig. 2 is a sectional side elevation in section on the line 2 2 of Fig. 1, of a portion of a vehicle with the improvement applied. Fig. 3 is a perspective detail illustrating a modified form of some portions of the structure. Figs. 4 and 5 are detail views illustrating the device applied to a two-horse vehicle.

In the improved device means are provided for instantaneous and simultaneous release of the traces or tugs from the swingletrees and of the thills from the holdback portion of the harness when attached to single vehicles, and when attached to double vehicles means are provided for releasing the traces or tugs only, as the draft-tongue in double vehicles being usually held from rearward movement only requires no special means for its release.

In the drawings the forward axle 10, a portion of the body 11, and the thills 12 13, having the usual cross-bar 14 connecting them, are shown in the usual construction except that the thills are shortened at their free ends, the purpose to be hereinafter explained. Attached centrally to the cross-bar 14 and rotative thereon is a bearing 15 for the swingletree 16, the latter being rotative in the bearing as well as free to swing horizontally to provide for absorbing the horse motion and preventing its communication to the vehicle. Attached to the thills 12 13, near the cross-bar 14, are small casings or housings 17 18, having longitudinal slots 19 20 in their upper sides, the casings for slidably receiving clips 21 22, attached to the rear ends of the tugs or traces 23 24 of the harness, the clips being provided with spaced apertures, as at 25, to receive the holding means. Attached to the ends of the whiffletree 16 and partaking of its motion are arms 26 27, extending over the casings 17 18. Pivoted upon the arms 26 27 are levers 30 31, having pins 32 33 extending through the slots 19 20 and into the apertures in the clips 21 22. Attached to the whiffletree 16 and the cross-bar 14 are springs 34 35, exerting their force to maintain the whiffletree yieldably in its forward or operative position, with the pins 32 33 engaging the clips on the traces. The levers 30 31 are also independently spring-supported to maintain them yieldably in operative position. By this arrangement it will be obvious that so long as the whiffletree is maintained by the springs 34 35 in its forward position the traces will be held fast in the casings 17 18, but longitudinally movable therein within the range of the slots 19 20 to provide for the usual "horse motion" exerted by the draft-animal. Then by rotating the whiffletree in its bearing 15 the arms 26 27, with their attached levers 30 31, will be elevated and detach the pins 32 33 from the traces and release them. If one of the traces is to be independently released, it can be quickly accomplished by simply pressing down on the free end of the lever 30 or 31, as the case may be, as will be obvious. By providing a plurality of the apertures in the clips it will be obvious that the traces may be lengthened and shortened, as required.

Means are provided for rotating the whiffletree from the driver's seat, which is constructed as follows: Projecting from the whiffletree 16 is an arm 36, and attached to the body portion 11 of the vehicle in convenient position for the driver is a lever-arm 37, having a projecting portion 38, connected by a flexible link, such as a chain 39, to the arm 36 on the whiffletree. A ratchet-plate 40 will be attached to the floor of the vehicle where the lever-arm 37 passes through to support the same and enable it to be held at any desired point.

When employed upon single harness, means must be provided for releasing the thills from the holdback portions of the harness, and in the improved devices herein shown and described is illustrated an approved means for accomplishing this result, consisting of casings 41, in which the free or forward ends of the thills 12 13 are detachably retained, the casings having loops 42 43 44 to receive the billets, respectively, of the back-band 45, girth 46, and holdback 47, the latter detachably connected to the breeching 48 by snaps 49 in the ordinary manner. The casings 41 are connected by snaps 50 to clips 51, which are in turn riveted or otherwise connected to the hame-tug portions of the harness in advance of the girth and back-band portions or to the breast-collar portions, according as to which form of harness is employed. By this arrangement it will be obvious that under normal conditions the horse is connected to the vehicle and will draw the latter in the usual manner. If, however, occasion arises for the release of the horse in event, for instance, of his becoming fractious or attempting to run away or otherwise jeopardizing the safety of the occupants of the vehicle, a simple push upon the lever 37 will cause the projection 38 to depress the arm 36 through the connecting-chain 39, rotate the whiffletree 16, and elevate the arms 26 27 and release the traces, as before described, when the horse will be free to move forward and at the same time carry casings 41 from the thills.

In Fig. 3 a modified construction of the means for rotating the whiffletree 16 is shown, consisting in a bar 52, mounted for rotation in bearings 53 upon the thills 12 13 in the rear of the cross-bar 14 and provided with a lateral arm 55, connected by the chain 39 to the arm 36 on the whiffletree. A longer arm 57 extends from the bar 52, and from the free end of this longer arm a strap 58 extends to a point on the body of the vehicle convenient to the driver. By this arrangement it is obvious that a simple pull on the straps 58 will cause the rotation of the bar 52 and the corresponding rotation of the whiffletree and release of the horse in the manner as by the mechanism heretofore described.

When employed upon double vehicles, as illustrated in Figs. 4 and 5, the slotted casings 17 18 will be attached to the swingletrees 59 60, swiveled upon the doubletrees 61, the latter in turn swiveled in the ordinary manner to the draft-tongue 62. Mounted for rotation upon the draft-tongue, as by bearings 63 in the rear of the doubletrees, is a bar 64, similar to the bar 52 in the modification shown in Fig. 3 and having small lateral arms 65 66 at its ends connected by chains 67 68 to projections 69 70 on rods 71 72, mounted for rotation on the swingletrees 59 60, the rods having their ends 75 76 77 78 bent into studs for engaging the apertures 25 in the trace-clips 21 22, as shown more clearly in Fig. 5. The bar 64 is provided with a relatively long arm 73, from which a strap 74 leads to a point within reach of the driver's seat. By this means it is obvious that a simple pull upon the strap 73 will release the horses simultaneously in the same manner as before described for the release of the single horse.

The various modifications herein illustrated may be employed without departing from the principle of the invention or sacrificing any of its advantages, as the same results are produced in all the modifications and in substantially the same manner.

Having thus described the invention, what is claimed is—

1. In a horse-releasing device, casings carried upon the vehicle for detachably receiving the free ends of the traces and provided with longitudinal slots, catches engaging the traces through said slots, and means operative by the driver for releasing said catches.

2. In a horse-releasing device, casings carried upon the vehicle, the traces having transverse apertures and slidable in said casings, catches for detachably engaging said apertures within the casings, and means operative by the driver for releasing said catches.

3. In a horse-releasing device, casings carried upon the vehicle, the traces having a plurality of spaced transverse apertures and slidable in said casings, catches for detachably engaging said apertures within the casings, and means operative by the driver for releasing said catches.

4. In a horse-releasing device, casings carried upon the vehicle for detachably receiving the free ends of the traces, catches engaging the traces within the casings, receivers for the forward ends of the thills and connected to the holdback portion of the harness, and means under the control of the driver for releasing said catches.

5. In a horse-releasing device, means for detachably coupling the traces to the vehicle, means under the control of the driver for detaching said coupling means, receivers for the forward ends of the thills and having means for connection to the harness, and connecting means between said receivers and the breeching portions of the harness.

6. In a horse-releasing device, means for detachably coupling the traces to the vehicle, means under the control of the driver for detaching said coupling means, receivers for the forward ends of the thills and having loops for supporting straps for connecting respectively with the back-strap, girth and hold-back portions of the harness and with means for connection with the traces in advance of the back-straps and girth.

7. In a horse-releasing device, receivers for attachment to the thills adjacent to the whiffletree, the traces having transverse apertures and slidable in said casings, the whiffletree mounted for rotation upon said thills and carrying catches for engagement within said casings with the perforations in said traces, and means under the control of the driver for rotating said whiffletree and releasing said catches.

8. In a horse-releasing device, receivers for the ends of the traces, the whiffletree carrying catches for engaging the traces in said receivers, and means operative by the driver for actuating said catches for releasing said traces.

9. In a horse-releasing device, receivers for the ends of the traces, the whiffletree carrying catches for engaging the traces in said receivers, means for yieldably maintaining said whiffletree in its forward position, and means under the control of the driver for rearwardly rotating said whiffletree to release said catches.

10. In a horse-releasing device, receivers for the ends of the traces, the whiffletree carrying catches for engaging the traces in said receivers, springs disposed to hold said whiffletree with its catches yieldably in engagement with said traces, and means under the control of the driver for reversely actuating said whiffletree to release said catches.

11. In a horse-releasing device, receivers for the ends of the traces, the whiffletree carrying arms extending over said receivers, levers movably connected to said arms and spring-supported thereon and provided with pins for engaging said traces within the receivers.

In testimony that I claim the foregoing as my own I have hereto affixed my signature in the presence of two witnesses.

EDMUND A. BARNES.

Witnesses:
  E. E. CHALMERS,
  JOHN W. JONES.